INVENTORS
DALE O. BALLINGER
JOHN L. McKINLEY
ATTORNEY

United States Patent Office 3,001,714
Patented Sept. 26, 1961

3,001,714
ECONOMIC POWER GENERATION ASSIGNMENT DEVICES
John L. McKinley, 660 Oneida, and Dale O. Ballinger, 1690 Lewis, both of Denver, Colo.
Filed Dec. 19, 1956, Ser. No. 629,404
19 Claims. (Cl. 235—184)

This invention relates to a method and apparatus for calculating and automatically allocating the most economic power generation assignment among any number of electric generators operating together on a power system in accordance with facts usually known or immediately available during the course of normally accepted procedures for operating any power system having more than one power generating unit; more specifically, it provides in one compact unit a calculator embodying electronic equipment for accurately accomplishing these purposes which are more generally known by the technical terms, "economic loading" or "incremental loading"; since the lowest cost of production of power usually results when the next increment of system load is added on the generator having the lowest incremental cost and conversely when the next decrement of system load is taken away from the generator operating at the highest decremental cost.

Usually, a loading pattern for a power system is developed from a group of curves or numerical tables which serve as a guide for the power system operators in making the load assignments on generators which will provide the lowest overall cost of generation. Basically, in the case of fuel operated generating units the performance for each generating unit is represented by an input-output curve, where the input is usually evaluated in British thermal units heat input per hour and the output represents kilowatts generated. The input might be evaluated in the equivalent of heat as units of fuel or as a cost per unit of heat or of fuel. Since an input-output curve represents the overall efficiency of the source of energy, its conversion into useable mechanical energy and finally into electrical energy as the end product, it is evident that it is an accurate means for determining relative costs of production. The most common, but not limited, application is the one steam boiler and one turbo-generator power generating unit of the modern power stations. If the heat input and the power generated are plotted on an input-output curve for the specific generating unit, the slope of the curve at any output or kilowatt load represents the incremental heat rate at that load. Since the graph is a continuously curving line the slope is different at any point and a very large number of incremental heat rates can be obtained; more than it is practical to recognize. However, if the curve is divided into any number of equal segments each represented by a straight line, the curve becomes a series of straight line segments each of which will represent a constant incremental heat rate. If the number of segments is properly chosen, no significant sacrifice of accuracy will result. The heat rate curves are so represented in this device as will be explained in detail.

However, heat rate or input-output curves are subject to many variables all of which must be recognized if reasonable accuracy is to result from the automatic comparison and selection of economic incremental load assignments. A given boiler and turbo-generator unit operating under optimum conditions will obtain a given heat rate but if any of the conditions are changed the heat rate also will be changed. A different combination of boiler and turbo-generator will usually result in a different heat rate and the operation of a turbo-generator from a steam header supplied by two or more boilers will produce variations in the heat rate depending upon the combination of boilers in service at any time. An important factor which influences the heat rate is the turbine back pressure or vacuum which varies with the condensing water temperature and condition of the condenser which are both variable. However, a convenient index to these variables is instantly available from the vacuum gage readings and with this information the appropriate alteration in the heat rate curve can be made in this device to reflect the change and condition at any time. In any of the similar devices heretofore devised provision has not been made for correction of the heat rate curve by the direct insertion into the computation of vacuum, per se, as usually measured and as available instantly at any time in inches of mercury.

The cost of fuel and kind of fuel are factors which enter into the determination of economics and production costs. Rather than to provide for the selection of fuel whether coal, gas or oil, for example, it is desirable to use a factor common to all types or combinations of fuels. In this device fuel is evaluated in cents per million British thermal units which is a known and instantly available value; therefore, the kind or proportion of combinations of fuels used at any time only need be known and the corresponding appropriate cost of fuel in cents per million B.t.u. as predetermined for each generating unit will be inserted directly into the computation.

Since load assignments on interconnected generating stations and frequently within a station are not always made on an economic basis due to necessities such as optimum minimum loads, required boiler loads for slagging, bled steam requirements, etc., provision must be made in computation for handling these special situations conveniently without sacrificing the accuracy of the computations affecting other generating units on the power system. In this device the provision for locking these special load assignments into the overall load requirement of the system is more easily accomplished and is visually more evident for each generating unit to which such special assignments are made than in any similar device heretofore devised.

Similarly, maximum and minimum load assignments for any generating unit are known from test data and experience and are subject to variations as affected by conditions known to exist at any time. Provision in this device for visual observation of these load settings is augmented by the illuminated warning signals showing that the maximum or minimum load as displayed has been attained; thereby giving notice to the operator of the exact assignment of loads among the generators on the system as related to the maximums or minimums established at any time on individual generating units.

In operating a power system it is essential in the interest of continuity of service to its customers that reasonable precautions be taken to insure against the unforeseen and probable failure of any part of the system. Usually, it is the practice to operate generating capability, spinning and connected to the system, in excess of the expected maximum load on the system and the excess of capability over system load to be made instantly available is usually established at least equivalent to the largest generating unit or other source of power on the system that might thru some unforeseen circumstance fail. No other similar device heretofore devised has automatically provided for the direct computation and visual observation of spinning reserve instantly under any condition of system loading or availability of power sources.

The incremental cost of electric energy generated by any combination of generating sources and under any conditions is instantly available and may be observed visually at all times. Obviously, the special load assignments referred to, inavailability of generators and forced uneconomic generation assignments may be readily compared and evaluated in terms of dollars reflecting the penalties incurred; also in selecting new generating units for addition to the system the composite effects of alternate proposals may be readily evaluated in dollars as a guide toward the selection of the most economic combination of generating units for the system load.

This device does not within itself provide for the direct computation of the, so named, "penalty factors" relating to transmission losses; however, it provides for the insertion of generator assignments as modified by transmission losses as determined by analysis, digital computation or other method. It also provides for the insertion into total load of other sources of power not influenced by the incremental cost of energy produced on the system for which the device is designed.

One object of this invention is a relatively low cost analog computer for the instantaneous determination of incremental costs of generating electric energy from data readily available during the course of normal operations of a power system.

A further object of this invention is to provide a device for independently checking and validating the operation of automatic power system load control equipment used on an electric power system to change generator load assignments in accordance with predetermined schedules, usually made on a percentage change vs. percentage load basis, which schedules are not subject to the modifications and effect of instantaneous changes in operating conditions as available from this invention.

A further object of this invention is to provide a device for the calculation of the economies likely to result from the selection of additional new generating units to be installed on an electric power system.

A further object of this invention is to provide a calculation for determining the effect of inavailable generating units on a power system so that the economies associated with shut-down time can be readily evaluated, e.g., economic justification for accelerated maintenance schedules.

A further object of this invention is to provide a calculator for determining instantaneously under any schedule or optimum operating conditions the quantitative evaluation of spinning reserve on an electric power system.

A further object of this invention is to provide instantaneous quantitative and visual indication of the type of generation assignment resulting on any generating unit on the power system under any given conditions.

A further object of this invention relates to the convenience of having in one relatively small space all of the essential devices for the determinations and evaluations herein recited and to the portability of this device.

A further object of this invention relates to the convenience and flexibility afforded thru the design permitting the use of plug-in type variable quantities so that components are interchangeable and so that an initial computer may be expanded as additional generating units are added on the power system by the addition of one standard plug-in type panel representing the added generator.

A further object of this invention relates to its adaptability to any power system where more than one generating unit is in service.

With these primary and other essential objectives in view, as will be more fully developed in the specification, this invention consists of the electrical and mechanical features of construction, electronic circuits, the parts and combinations thereof and the mode of operation or the equivalent as hereinafter described and set forth in the claims.

Referring to the accompanying drawings wherein is shown the preferred but obviously not necessarily the only form of embodiment of this invention, FIGURE 1 is a diagrammatic view of the fundamental circuit of the generation assignment device forming the subject matter hereof and employed in carrying out the purposes of this invention.

Like parts are indicated by similar characters of reference thruout these views.

Figure 1:
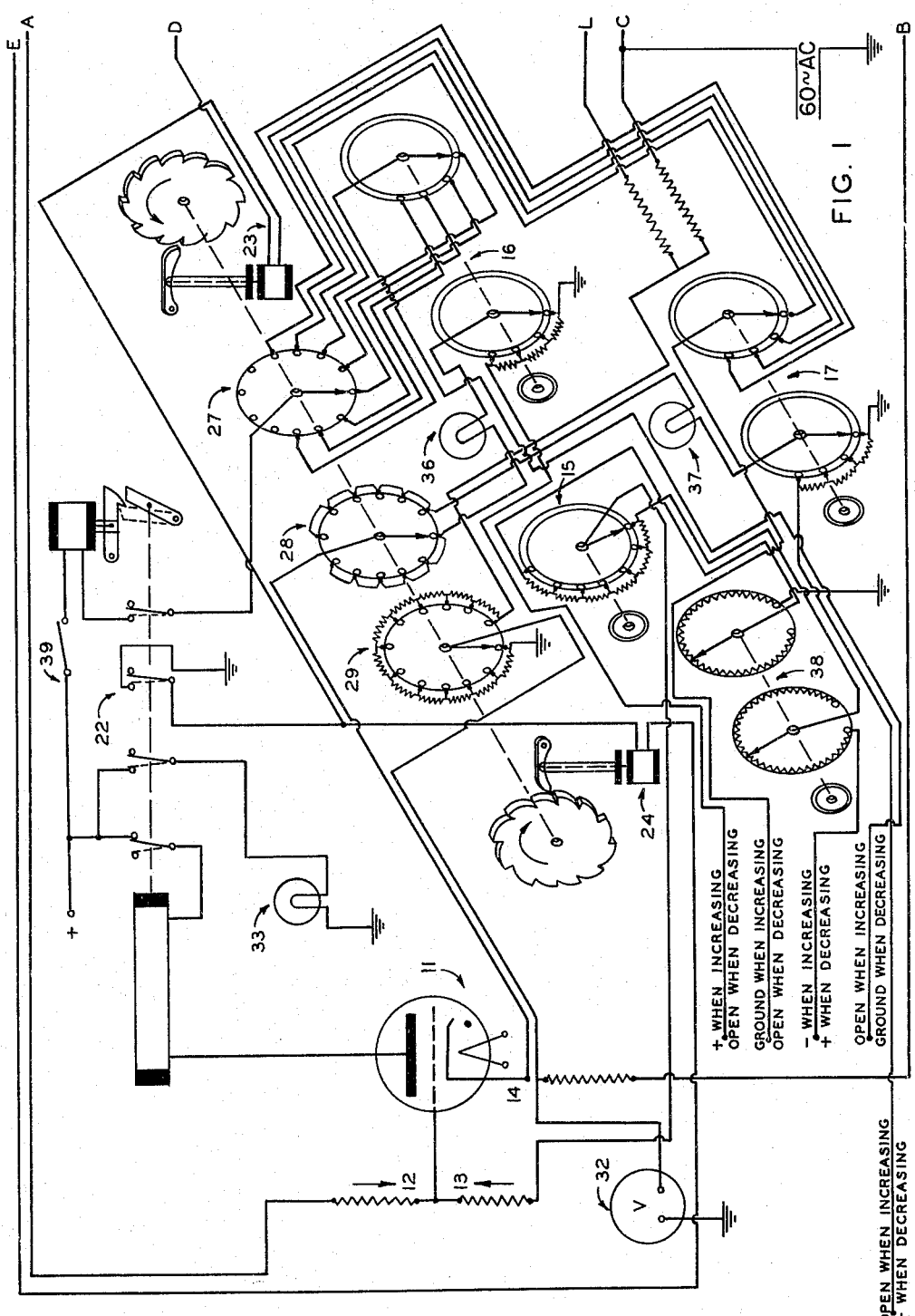

Each generator on the power system is represented by a device as illustrated in FIGURE 1. The operation of this device is as follows:

The conduction thru the Thyratron tube 11 is controlled by the combination of voltages at points 12, 13 and 14. The voltage at point 12 is proportional to the incremental cost of generated power. This voltage is positive (+) when the cost is increasing and negative (−) when the cost is decreasing. The voltage at point 13 is proportional to the fuel cost. The voltage at point 14 is proportional to the minimum generation setting if the incremental cost is increasing and to the maximum generation setting if the incremental cost is decreasing; thus, conduction thru the Thyratron tube 11 is a function of the fuel cost of the generator, the maximum or minimum setting of the generation for the generator and the incremental cost of generated power common to all generators.

The fuel cost rotary switch 15 for each generator is adjusted for the cost of fuel being fired for operating the generator. By appropriate choice of electrical circuit constants the electrical resistance controlled by switch 15 represents fuel cost in cents per million British thermal units and by calibration the fuel cost dial may be made to read directly in cents per million British thermal units.

The minimum generation adjustment rotary switch 16 is adjusted similarly proportional to the desired minimum generation for each generator and the dial associated with switch 16 may be calibrated to read in kilowatts or megawatts.

The maximum generation adjustment rotary switch 17 is adjusted similarly proportional to the desired maximum generation for each generator and the dial associated with switch 17 may be calibrated to read in kilowatts or megawatts.

Figure 2:
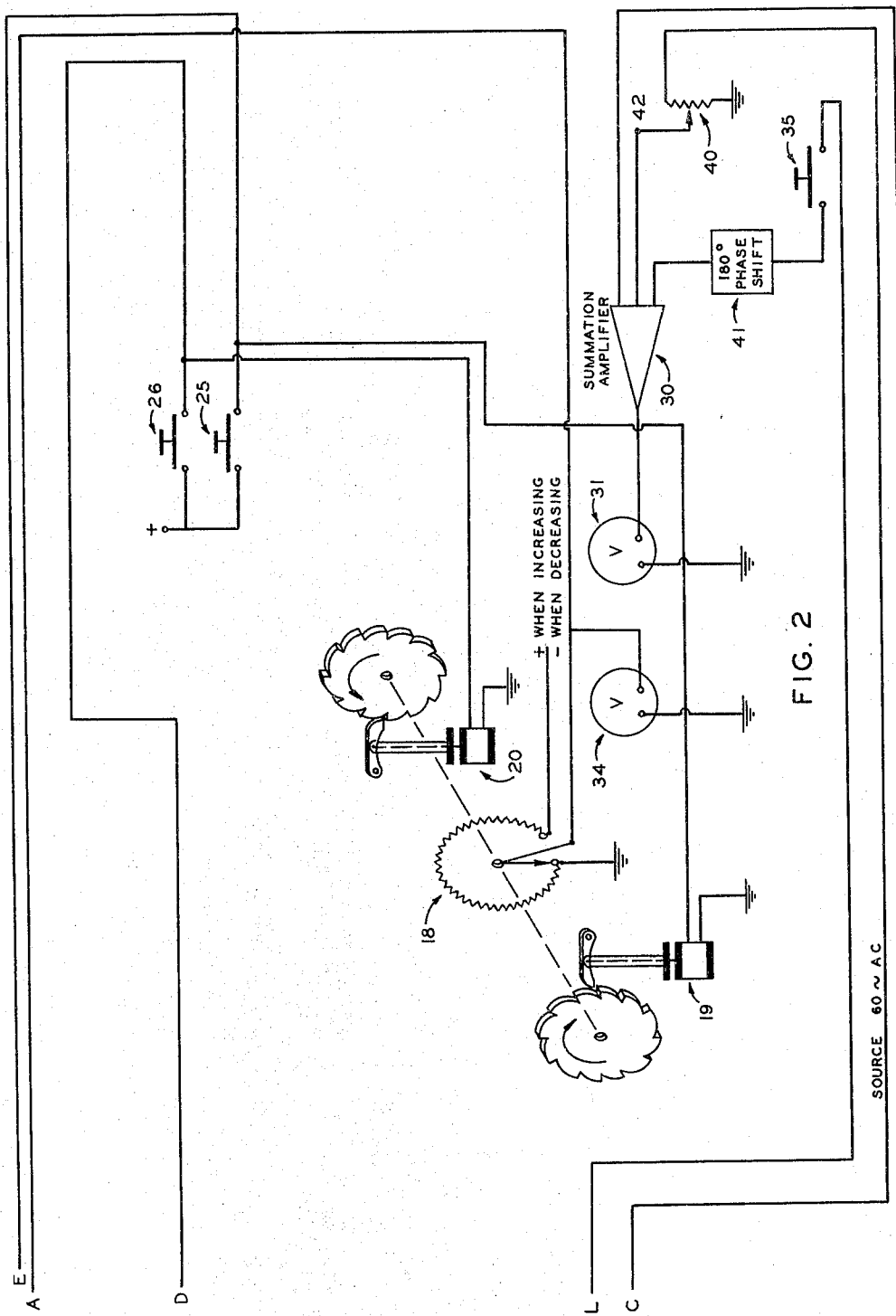
FIGURE 2 is a similar diagrammatic view of the fundamental circuit of the control equipment associated with the generation assignment device.

The Thyratron tube 11 will now conduct at a predetermined incremental cost of generation as indicated by the voltage at point 12 which is obtained by the precise linear potentiometer 18, FIGURE 2. This potentiometer 18 is electrically operated in equal steps by the rotary solenoid actuated steppers 19 and 20 controlled by push buttons 25 and 26.

Stepper 19 operates potentiometer 18 in a direction to increase the positive (+) voltage at point 12 and stepper 20 operates potentiometer 18 in a direction to decrease the negative (−) voltage at point 12; thus, the Thyratron tube 11 can be controlled to conduct when the incremental cost is either increasing or decreasing.

Whenever the Thyratron tube 11 conducts the latch relay 22 operates. This relay 22 electrically connects the generator rotary switch actuating solenoids 23 and 24 to the "increase" push button 25, FIGURE 2, and to the "decrease" push button 26, FIGURE 2. The push buttons 25 and 26 then operate the generator rotary switch as well as the incremental cost potentiometer 18.

The generator rotary switch has three rotary sections: The function of the first section 27 is to release relay 22 when the generator setting has attained its maximum or minimum point. The second section 28 prevents the Thyratron tube 11 from conducting and consequently prevents relay 22 from operating when the generation has reached maximum when increasing or minimum when decreasing. The third section 29 is the electrical equivalent of the incremental heat rate curve for a specific generating unit on the power system broken into a number of straight line sections represented by appropriate electrical resistances; therefore, this section obtains a voltage which is proportional to the incremental heat rate for the generator. This voltage is applied to the summation amplifier 30 along with the various outputs from other similar generator sections and along with other system outputs represented by variable resistances 40 not entering into the economic dispatch computation brought together at point 42. These are all summed and the total system generation or total system load is displayed on meter 31. The individual generation outputs which make up this total will be displayed separately on individual meters 32. The panel light 33 indicates visually when the generator is operating in its "regulating" range; that is, it is operating somewhere between its maximum and minimum values. Similarly, panel light 36 indicates visually when the generator is operating at its assigned minimum value. Similarly, panel light 37 indicates visually when the generator is operating at its assigned maximum value. Meter 34 indicates the voltage at point 12 and is calibrated to display the incremental cost of delivered power on the system in mills per kilowatt hour, since this voltage is proportional to the incremental cost of delivered power.

If it is desired to set into the computation a fixed generation value on any generator the potentiometer 18 is temporarily adjusted by the push buttons 25 and 26 until the desired fixed generation is displayed on meter 32 for the specific generator for which the fixed load assignment is required and at this point switch 39 is opened thereby releasing relay 22 which prevents the generator sections as controlled by steppers 23 and 24 from participating in adjustment to the total power system load until switch 39 is again closed, thus, the specific generator unit required to accept a fixed load assignment will not affect the accuracy of the proper distribution of load among the other generator units simulating the power system not operating on a fixed assignment.

Variable resistances or potentiometers 38 are inserted into the circuit to adjust the position of the fuel cost rotary switch 15 in the circuit. Two such devices precisely connected are necessary; one obtains the correct position of any specific generator on the incremental cost axis of the incremental heat rate curves which incremental cost axis is represented by the uniformly variable voltage at point 12 common to all generator units on the system; the other device will accomplish the same effect in relation to predetermined corrections necessary for the turbine back pressures; however, in this instance it is necessary to calibrate the dial to read in absolute inches of mercury back pressure, a value readily obtainable from the normal complement of instruments associated with turbo-generators on a power system.

The variable resistance 29 representing the electrical equivalent of the incremental heat rate curve for a specific generating unit on the power system may be modified by transmission loss penalty factors computed by any conventional method and the so modified incremental heat rate curve may be substituted for any other similarly modified incremental heat rate curve or for an incremental heat rate curve not so modified by simple substitution of the electrical resistances represented by 19. This may be accomplished by electrical switching or other means; such as, plug-in type resistance units.

If the total generation assignment as computed by this device for any condition is subtracted from the summation of the maximum capabilities of all of the generators on the system entering into the computation the remainder is the "spinning reserve" or the reserve of available power in excess of power system load requirements at the time. By depressing the spinning reserve push button 35 the maximum capabilities of all generating units are impressed on the summation amplifier 30 after being shifted in phase 180° by the phase shifter 41 so that the output as displayed on meter 31 is proportional to the spinning reserve and since meter 31 is calibrated in kilowatts or megawatts a direct reading of this value is obtained.

Thus, this electrical circuit is capable of reproducing, in straight line steps, the incremental heat rate curve of a power system generator and if each generator on a power system is represented by such a circuit the most economical operating point of each generator on the power system can be obtained for any total load on the power system.

It is assumed, for sake of simplicity, that the power system includes three generating units on which it is desired to determine the economic assignment of respective generations by means of the invention under the several conditions to be related. Each of the three generators is represented by a device as illustrated in FIGURE 1 of the application. It is assumed that the appropriate electrical resistors have been inserted into the circuit to represent the incremental heat rate of each generating unit, the maximum generation settings, the minimum generation settings and the fuel cost; also that the required correction of positioning of the fuel cost adjustable resistance in the circuit has been predetermined so that the changes in turbine operating efficiency or economy (back pressure) can be compensated for in relation to the cost of generation. Having thus prepared the electrical equivalents of each generating unit each as represented by a device similar to FIGURE 1 of the application and having made the appropriate electrical connections to a control device FIGURE 2 of the application reference is now made to the graph of FIGURE 3.

The three generators assumed for illustration are designated respectively:

Unit No. 1—100 mw.—Capability 115 mw.
Unit No. 2—66 mw.—Capability 70 mw.
Unit No. 3—44 mw.—Capability 47 mw.

The total capability is 232 mw.

The incremental heat rates for each of the generating units are plotted as shown: Gross generation vs. incremental cost per net kw. h. generated in mills. The abscissa thus represents incremental B.t.u. per net kw. h. generated evaluated in equal increments of cost the analog of which is a voltage controlled in equal increments by the precise linear incremental cost potentiometer 18, FIGURE 2. This potentiometer, in fact, is the abscissa of the plot shown representing the voltage at point 12, FIGURE 1 which is positive (+) when the cost is increasing and negative (−) when the cost is decreasing from a source of direct current supplied to potentiometer 18, FIGURE 2, which change in polarity can be accomplished by various well known means such as a manual throw-over switch, a relay or other common device actuated in conjunction with the push buttons 25 and 26. The circuit conditions detailed on FIGURE 1 are similarly accomplished as push buttons 25 and 26 are operated to increase or decrease the control voltage in equal increments representing equal steps of cost and in turn the desired power system total generation requirement as displayed on meter 31 appropriately calibrated to read in megawatts system power requirement as each generating unit is brought into the circuits.

Figure 3:
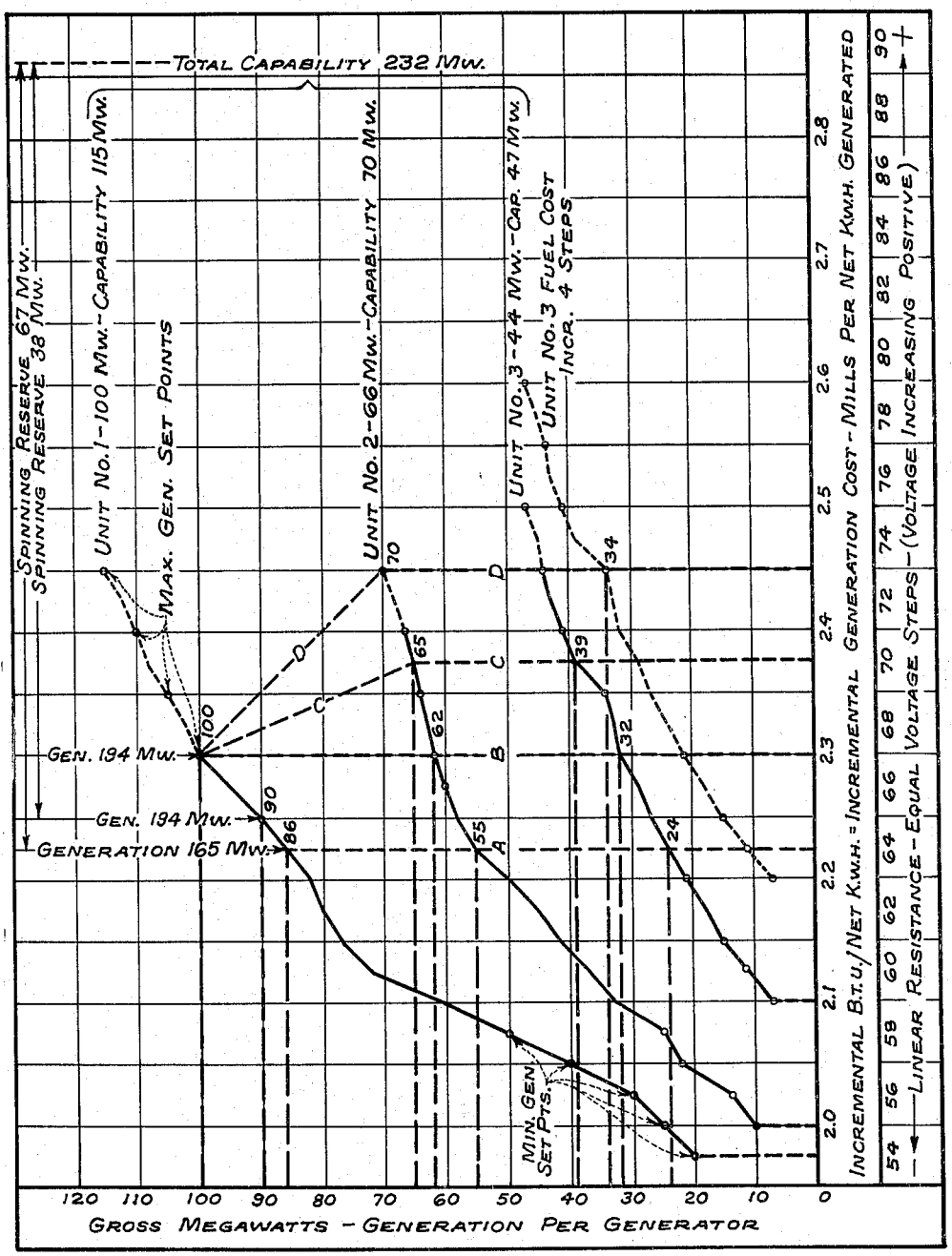
FIGURE 3 is a graph illustrating examples of economic power system dispatch as computed by this invention.

Referring to the graph of FIGURE 3, each of the three generating unit incremental heat rate curves is shown with the minimum and maximum generation set points selected for the example. The minimum set points of Unit No. 1 are 20, 25, 30, 40 and 50 mw. and the maximum set points are 90, 100, 105, 110, 115 mw.; Units No. 2 and No. 3 have similar minimum and maximum set points as shown. These set points are selected by positioning the minimum generation rotary switch 16 and the maximum generation rotary switch 17 appropriate for each generating unit.

*Problem No. 1.*—Assume that the three generating units are operating available to accept power system load and that the costs of fuel required to operate each unit are equal; also that the units are operating with normal turbine back pressures.

It is desired that no special minimum or maximum load setting limit the generation on any unit—that is, only the first minimum step and last maximum step will be set on rotary switches 16 and 17 for each unit. It is desired to compute the correct economic generation assignment for each generating unit for a system load of 165 mw.

Push buttons 25 and 26 are operated to adjust the control voltage step by step until meter 31 displays 165 mw. At this point the separate meter 31, FIGURE 1, on each generating unit device will display the correct generation assignment for that unit. Unit No. 1 should be generating 86 mw., Unit No. 2 should be generating 55 mw., and Unit No. 3 should be generating 24 mw. The sum of these generation assignments is 165 mw. which solves the problem. The three generating units are operating at equal incremental cost which is displayed on meter 34 and as shown on the graph (ordinate A) as 2.225 mills per net kw. h.; meter 34 which measures the voltage across the control potentiometer 18 having been calibrated to read in mills cost as an analog of voltage. If it is desired to determine the spinning reserve available push button 35 is depressed to display on meter 31 the summation of the maximum capabilities of the three generating units shifted in phase 180° by phase shifter 41 therefore representing the remainder (232 mw. capability less 165 mw. assignment for system load) shown on the graph as 67 mw. spinning reserve.

*Problem No. 2.*—Assume that the general conditions set forth under problem No. 1 are valid. It is desired that the correct generation assignments among the three generators be determined for a system load of 194 mw.

Bush button 25 is depressed to operate stepper 18 in the direction to increase the control voltage until 194 mw. is displayed on meter 31 which in this example represents an increase in cost from 2.225 mills to 2.3 mills per net kw. h. displayed on meter 34 and as indicated (ordinate B) on the graph at which point the correct generation assignments read on the respective meters 32 are Unit No. 1, 100 mw., Unit No. 2, 62 mw. and Unit No. 3, 32 mw. The spinning reserve similarly becomes 38 mw. as read by depressing push button 35.

*Problem No. 3.*—Assume that the general conditions set forth under problem No. 2 are valid except it is desired that No. 1 unit shall be limited to a maximum generation of 90 mw. The maximum generation rotary switch 17 of the device FIGURE 1 for Unit No. 1 is set at 90 mw. The total system generation desired is 194 mw.

Push button 25 is depressed to operate stepper 19 in the direction to increase the control voltage until again 194 mw. is displayed on meter 31. The respective generation assignments read on meters 32 are Unit No. 1, 90 mw., Unit No. 2, 65 mw. and Unit No. 3, 39 mw. As before the spinning reserve is 38 mw. The control voltage as measured in mills per net kw. h. has advanced from 2.3 mills per net kw. h. to 2.375 mills per net kw. h. as shown on meter 34 and by ordinate and line C on the graph. This increase in cost of generation obviously represents the penalty for transferring to Units No. 2 and 3 the 10 mw. of generation which could more economically be generated on Unit No. 1 had it not been limited to 90 mw. maximum.

*Problem No. 4.*—Assume that the general conditions set forth under problem No. 3 are valid except it is desired to reflect in the economic dispatch the effect of an increase in fuel cost or an equivalent change in turbine back pressure equal to four fuel cost steps. Either the fuel cost rotary switch 15 of the device representing Unit No. 3 is advanced four steps in cost if the occasion is wholly a fuel cost increase on Unit No. 3 or potentiometer 38 is adjusted the equivalent of four steps in cost as calibrated if the occasion is wholly due to a change in turbine efficiency as conveniently available from the turbine back pressure. Obviously, similar adjustments of any magnitude in consonance with the operating conditions of any generating unit may be made simultaneously.

In this example the increase of four fuel cost steps for Unit No. 3 will have the effect of shifting the incremental heat rate curve to the position shown dotted on the graph four cost steps advanced each step equivalent to $0.000025 per net kw. h. Therefore, the computation so represented is precise for all practical considerations of the economic dispatch. The desired system generation will be assigned as displayed on the respective meters 32 when the required system load of 194 mw. is again displayed on meter 31 as before by depressing push button 25 to operate stepper 19 to increase the control voltage. The generation assignments are Unit No. 1, 90 mw., Unit No. 2, 70 mw. and Unit No. 3, 34 mw. The spinning reserve is 38 mw. The incremental cost of generation as shown on the graph and as displayed on meter 34 is 2.45 mills per net kw. h. represented by ordinate and line D.

The penalty for having to reassign generation due to the four cost steps increase in cost of generation on Unit No. 3 as shown is equivalent to 2.45 mills less 2.375 mills or $0.000075 per net kw. h. occasioned by the transfer of 5 mw. of generation from Unit No. 3 to Unit No. 2.

*Problem No. 5* (*not shown on the graph*).—Assume the same general conditions as set forth under problem No. 4 are valid with the exception that Unit No. 2 will not be permitted to generate more than 65 mw. Since 65 mw. is not a predetermined maximum set point it is necessary to position potentiometer 18 by depressing push button 25 or 26 to operate steppers 19 and 20 until 65 mw. is displayed on Unit No. 2 meter 32 at which point switch 39 is opened to release relay 22 so that the Unit No. 2 generator device will not participate in further system load assignment.

Since the required system load is 194 mw. push button 25 will be depressed until stepper 19 has positioned potentiometer 18 so that 194 mw. is displayed on meter 31. Evidently Unit No. 1 cannot participate in an increase in system requirement greater than 90 mw. since the maximum generation on this unit has been so set and Unit No. 2 cannot now participate in an increase in system requirement greater than 65 mw., since this generation has been fixed at 65 mw. The system requirement must be satisfied by Unit No. 3 the generation assignment for which will be displayed on meter 31. The increased cost of transferring 5 mw. of generation from Unit No. 2 to Unit No. 3 by reason of fixing a limit of 65 mw. participation on Unit No. 2 is, reading from the graph, at 39 mw. on the shifted Unit No. 3 heat rate curve 2.475 mills less 2.450 or $0.00025 per net kw. h. Meter 31 will display 2.475 mills corresponding with an ordinate thru 39 mw. on the shifted heat rate curve of Unit No. 3. The spinning reserve may be obtained as in previous problems by depressing push button 35.

So as to more thoroughly explain the operation of this invention it is necessary to suggest that the preceding problems are only illustrative of the most usual computation. Obviously as push buttons 25 and 26 are depressed to operate steppers 19 and 20 to position the precise linear potentiometer 18 and as the auxiliary switches or relays associated with the operation of push buttons 25 and 26 will change the circuit as shown on FIGURE 1 and the input voltage to potentiometer 18 either to positive (+) or negative (—) as the direction of rotation of the movable arm of the potentiometer is changed either to increase voltage or decrease voltage as required the voltage delivered at point 12, FIGURE 1, will become positive (+) when increasing and negative (—) when decreasing. Such voltages are proportional to the incremental cost of generation of power as has been described in the problems.

The voltage at point 13, FIGURE 1 is proportional to the fuel cost as has been described in the specification and as shown in FIGURE 1.

The voltage at point 14, FIGURE 1, is proportional to the minimum generation setting if the incremental cost is increasing and to the maximum generation setting if the incremental cost is decreasing. Since the voltage at point 12 can be controlled as has been described to increase positive (+) or decrease negative (—) the Thyratron tube 11 can be controlled to conduct when the incremental cost (control voltage) is either increasing or decreasing. The Thyratron tube 11 must conduct at a different incremental cost or control voltage when the generation is increasing than when the generation is decreasing; therefore, the voltage change at point 14 is proportional to the minimum and maximum generation settings. Assuming that the incremental cost (control voltage) is increasing it is desired that the Thyratron tube 11 shall conduct at the lowest point of the incremental heat rate curve to operate relay 22 so as to cause stepper 24 to operate the generator rotary switch, section 29 of which represents the electrical equivalent of the incremental heat rate curve. Stepper 24 will operate then as push button 25 is depressed and all devices of FIGURE 1 will operate together in step under the same conditions whenever push button 25 is depressed. As the incremental cost (control voltage) is increased by continuing to depress push button 25 stepper 24 continues to operate rotary switch section 29 until a maximum is reached at which point relay 22 releases and no further increase is indicated for the generator so represented even though the incremental cost (control voltage) continues to increase beyond the set maximum value for the generating unit represented.

Similarly as the incremental cost (control voltage) is decreased by depressing push button 26, stepper 23 will operate to change the position of its associated rotary switches including rotary switch section 29 provided that the Thyratron tube 11 has conducted to operate latch relay 22 thereby connecting stepper 23 into the circuit. As the incremental cost (control voltage) decreases Thyratron tube 11 will conduct when the set maximum generation is reached thereby operating latch relay 22 and connecting stepper 23 into the circuit until the set minimum generation is reached at which point latch relay 22 will release and no further decrease in generation is indicated for the generating unit represented even though the incremental cost (control voltage) continues to decrease beyond the set minimum value for the generating unit represented.

It has been illustrated by means of the problems that several generating units are represented by appropriate incremental heat rate curves may be positioned on a voltage axis represented by uniform incremental costs, the abscissa of the graph. The positioning of these separate heat rate curves on the voltage axis is predetermined for similar conditions of operation of each generating unit represented. It is desired to build into this device means for departing from said similar conditions by making adjustments as required by operating conditions. These conditions may be recognized as desired minimum and maximum values of generation, required changes in fuel costs and necessary adjustments in economy due to turbine back pressure changes. All of these adjustments as has been demonstrated in the problems will cause changes in the points (voltages) at which the Thyratron tube 11 will conduct.

Referring to the rotary switch 27 of FIGURE 1, it is evident that four contacts on this switch near the upper limit of travel are connected to switch 17 which is the maximum generation adjustment rotary switch, the movable arm or contact of which is always grounded when the generation is increasing. A ground thru this movable arm or contact can be placed on any of the four upper contacts of rotary switch 27 as selected by switch 17. When rotary switch 27 has increased to the selected contact representing the desired maximum generation as referred to switch 17 the latch release solenoid of relay 22 is energized. This release of relay 22 removes the ground from rotary switch 27 by opening the fourth group of contacts of relay 22 and causes stepper 24 to operate thru the third group of contacts of relay 22 to ground. Rotary switch 27 will never make a complete revolution since conduction thru its movable arm or contact is limited both in an increasing direction and in a decreasing direction.

Similarly, the minimum generation assignment is accomplished thru the four contacts on rotary switch 27 near the lower limit of travel which are connected to switch 16 which is the minimum generation adjustment rotary switch the movable arm or contact of which is always grounded when the generation is decreasing. A ground thru this movable arm or contact can be placed on any of the four lower contacts of rotary switch 27 as selected by switch 16 causing the same operations resulting from the energizing of the release solenoid of relay 22 as just described. Switch 16 will be set on the contact representing the desired minimum generation.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. Means for allocating the most economic power generation assignment among a plurality of electric generators comprising in connection with each generator the combination of a thyratron tube having a cathode, a grid and an anode; a first means supplying current to the grid of said tube at a voltage which is proportional to the incremental cost of the power being generated by the generator; a second means supplying current to the grid of said tube at a voltage which is proportional to the cost of the fuel being used by said generator, so that the total voltage supplied to said grid will be proportional to the incremental cost of the generated power; a third means supplying current to the cathode of said tube at a voltage proportional to the minimum generating setting if the incremental cost is increasing and proportional to the maximum generating setting if the incremental cost is decreasing so that current conduction to the anode of said tube will be a function of the fuel cost of the generator, and a variable resistance fuel cost adjusting device in circuit with the second means for supplying current to the grid of said tube, said resistance being calibrated in cost per B.t.u.'s.

2. Means for allocating the most economic power generation assignment among a plurality of electric generators as described in claim 1 having a variable resistance minimum generation adjusting device which may be placed in circuit with the third means supplying current to the cathode of said tube which may be manually adjusted to the desired minimum generation of said generator.

3. Means for allocating the most economic power generation assignment among a plurality of electric generators as described in claim 2 having a variable resistance maximum generation adjusting device which may be placed in circuit with the third means for supplying current to the cathode of said tube which may be manually adjusted to the desired maximum generation of said generator.

4. Means for allocating the most economic power generation assignment among a plurality of electric generators as described in claim 3 having a two-throw switch in circuit in said third means whereby either said minimum generation adjusting device or said maximum generation adjusting device may be placed in the circuit of said cathode.

5. Means for allocating the most economic power generation assignment among a plurality of electric generators as described in claim 4 having a rotary potentiometer in series with said first means supplying current to the grid of said tube for adjusting the current in proportion to the incremental cost of generation.

6. Means for allocating the most economic power generation assignment among a plurality of electric generators as described in claim 5 in which the potentiometer is connected between a positive and a negative current supply so that when rotated in one direction it will increase the positive voltage supplied to said grid and when rotated in the other direction will increase the negative voltage supplied to said grid so that the thyratron tube can be controlled to conduct when the incremental costs are either increasing or decreasing.

7. Means for allocating the most economic power generation assignment among a plurality of electric generators as described in claim 6 in which the two-throw switch comprises: a first rotary switch which during substantially 180° of its rotation will connect said minimum generation adjusting device in circuit with said cathode and during the remaining substantially 180° will connect said maximum generation adjusting device in said latter circuit; a multipole latching relay in series with the anode of said tube; means for unlatching said relay; and a second rotary switch connected to revolve synchronously with said first rotary switch to prevent said tube from conducting when generation has reached maximum when increasing and minimum when decreasing; and a first solenoid for rotating said rotary switches in one direction and a second solenoid for rotating said rotary switches in the opposite direction.

8. Means for allocating the most economic power generation assignment among a plurality of electric generators as described in claim 7 having a variable resistance incremental heat rate curve mechanically connected with the first rotary switch so that the two will be simultaneously actuated by said solenoids; and said variable resistance incremental heat rate curve is connected in series with a source of power so that said variable resistance incremental heat rate curve varies the voltage in direct relation to the quantity of resistance in the circuit at any given time, which voltage represents the most economic power generation assignment at any given time.

9. Means for allocating the most economic power generation assignment among a plurality of electric generators as described in claim 8 having the electromagnet of said multipole relay in series with the anode of said tube; and contacts arranged to be opened and closed by said multipole relay for controlling the solenoids actuating said first rotary switch.

10. Means for allocating the most economic power generation assignment among a plurality of electric generators as described in claim 9 in which said second rotary switch is mechanically interconnected with both said variable resistance incremental heat rate curve and said first rotary switch so as to rotate therewith and in which said second rotary switch is connected to said unlatching means in said multipole relay to release the latter when the generator setting has reached its maximum or minimum point.

11. Means for allocating the most economic power generation assignment among a plurality of electric generators as described in claim 10 having said first rotary switch, said variable resistance incremental heat rate curve and said second rotary switch mechanically interconnected and operated by said solenoids controlled by said multipole relay, said thyratron tube and said maximum and minimum rotary adjusting devices all of which are actuated by said potentiometer controlling the supply of current to the grid of said tube and manually operated two-throw switch for actuating the third solenoid for rotating said potentiometer arm in one direction and a fourth solenoid for rotating said potentiometer arm in the opposite direction so that said first solenoid and said third solenoid shall operate simultaneously and said second solenoid and said fourth solenoid shall operate simultaneously when permitted to do so by the combined interaction of said potentiometer, said thyratron tube, said multipole relay, said maximum rotary adjusting device and said minimum rotary adjusting device.

12. Means for allocating the most economic power generation assignment among a plurality of electric generators as described in claim 11 having a first voltmeter calibrated to read in mills per kilowatt-hour connected in the electric circuit with said potentiometer to measure the incremental cost of generated power.

13. Means for allocating the most economic power generation assignment among a plurality of electric generators as described in claim 12 having a second voltmeter calibrated to read in megawatts or kilowatts connected in the electric circuit with each said variable resistance incremental heat rate curve to measure the quantity of generated power allocated to each electric generator.

14. Means for allocating the most economic power generation assignment among a plurality of electric generators as described in claim 13 having a summation amplifier connected in the electric circuit with each said variable resistance incremental heat rate curve to add the separate quantities of generated power allocated to each electric generator represented by voltages and to cause said sum to be measured by a third voltmeter calibrated to read in megawatts or kilowatts representing the total generated power.

15. Means for allocating the most economic power generation aissignment among a plurality of electric generators as described in claim 14 having a 180° phase shifter connected in the electric circuit with said variable resistance incremetal heat rate curve, said summation amplifier, said third voltmeter and a one pole switch for actuating said phase shifter so that said sum of generated power allocated will be subtracted by said phase shifter from the total available generated power the remainder of which is displayed on said third voltmeter as available spinning reserve electric power.

16. Means for allocating the most economic power generation assignment among a plurality of electric generators as described in claim 15 having a one-pole switch connected in the electric circuit with the unlatching means of said multipole relay so that at any point representing a desired generated power allocation said one-pole switch may be opened to operate the unlatching means of said multipole relay thereby establishing the desired invariable allocation of power generation.

17. Means for allocating the most economic power generation assignment among a plurality of electric generators as described in claim 16 having a manually operated first dual potentiometer connected in the electric circuit with said variable resistance fuel cost adjusting device to position said variable resistance fuel cost adjusting device in the electric circuit appropriately with respect to the variable voltages impressed on the grid of said thyratron tube for purposes of calibration.

18. Means for allocating the most economic power generation assignment among a plurality of electric generators as described in claim 17 having a manually operated second dual potentiometer calibrated to read in absolute inches of mercury back pressure connected in the electric circuit with said variable resistance fuel cost adjusting device to position said variable resistance fuel cost adjusting device in the electric circuit appropriately with respect to the computed positioning of said variable resistance fuel cost adjusting device required to reflect the effect of the variations in turbine back pressures from normal.

19. Means for allocating the most economic power generation assignment among a plurality of electric generators as described in claim 18 providing for the direct substitution for said variable resistance incremental heat rate curve by any appropriate commonly used practice with a modified similar variable resistance incremental heat rate curve representing the required modifications of said variable resistance incremental heat rate curve for transmission loss penalty factors.

References Cited in the file of this patent
UNITED STATES PATENTS
2,508,538     Posthumus _____ May 23, 1950